United States Patent
Sasai

(10) Patent No.: US 6,636,629 B1
(45) Date of Patent: Oct. 21, 2003

(54) IMAGE PROCESSING APPARATUS

(75) Inventor: Toshihiro Sasai, Kyoto (JP)

(73) Assignee: NuCore Technology Inc., Santa Clara, CA (US)

( * ) Notice: Subject to any disclaimer, the term of this patent is extended or adjusted under 35 U.S.C. 154(b) by 648 days.

(21) Appl. No.: 09/616,453

(22) Filed: Jul. 14, 2000

(30) Foreign Application Priority Data

Jul. 22, 1999 (JP) .......................................... 11-207412

(51) Int. Cl.$^7$ ................................................ G06K 9/00
(52) U.S. Cl. ........................ 382/167; 358/525; 348/273
(58) Field of Search ............................... 382/162–167; 358/504–540; 348/272–283

(56) References Cited

U.S. PATENT DOCUMENTS

| | | | |
|---|---|---|---|
| 4,630,307 A | 12/1986 | Cok | 382/25 |
| 4,642,678 A | 2/1987 | Cok | 358/44 |
| 5,631,703 A * | 5/1997 | Hamilton et al. | 348/273 |
| 5,805,217 A | 9/1998 | Lu et al. | 348/273 |
| 6,075,889 A * | 6/2000 | Hamilton et al. | 382/167 |
| 6,130,960 A * | 10/2000 | Acharya | 382/167 |
| 6,181,376 B1 * | 1/2001 | Rashkovskiy et al. | 348/273 |
| 6,563,538 B1 * | 5/2003 | Utagawa | 348/273 |
| 6,570,616 B1 * | 5/2003 | Chen | 348/272 |

FOREIGN PATENT DOCUMENTS

| | | |
|---|---|---|
| JP | 61-501423 | 7/1986 |
| JP | 61-501424 | 7/1986 |

* cited by examiner

Primary Examiner—Jingge Wu
(74) Attorney, Agent, or Firm—Townsend and Townsend and Crew LLP; Kenneth R. Allen

(57) ABSTRACT

An image processing apparatus includes an interpolation unit, compensation value calculation unit, and compensation unit. The interpolation unit interpolates the pixel value of each color signal at an interpolation point using the pixel values of pixels in the same color falling within a predetermined interpolation region including the interpolation point, and outputs the pixel value as an interpolated pixel value at the interpolation point for each color signal. The compensation value calculation unit generates a pixel compensation value for compensating the pixel value of the interpolation point using the pixel values of a plurality of pixels around the interpolation point that fall within a compensation region wider than and including the interpolation region. The compensation unit compensates the interpolated pixel value of each color signal at the interpolation point that is output from the interpolation unit by using the pixel compensation value corresponding to the interpolation point that is obtained by the compensation value calculation unit, and outputs the compensated interpolated pixel value as a new pixel value of each color signal at the interpolation point.

10 Claims, 11 Drawing Sheets

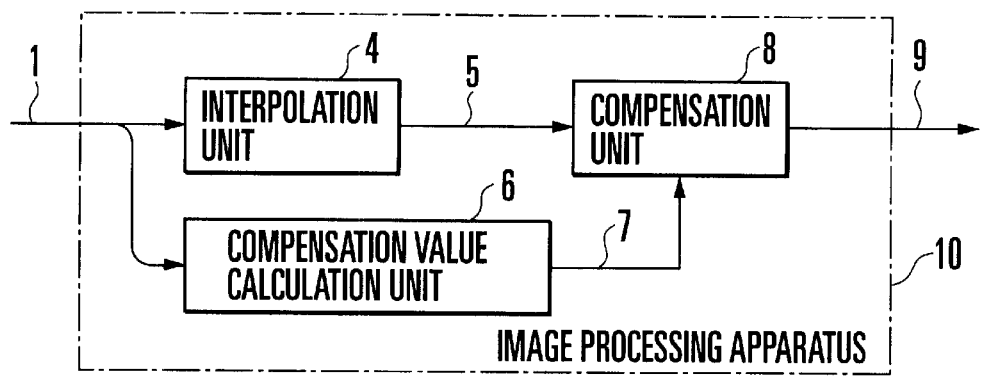
FIG. 1
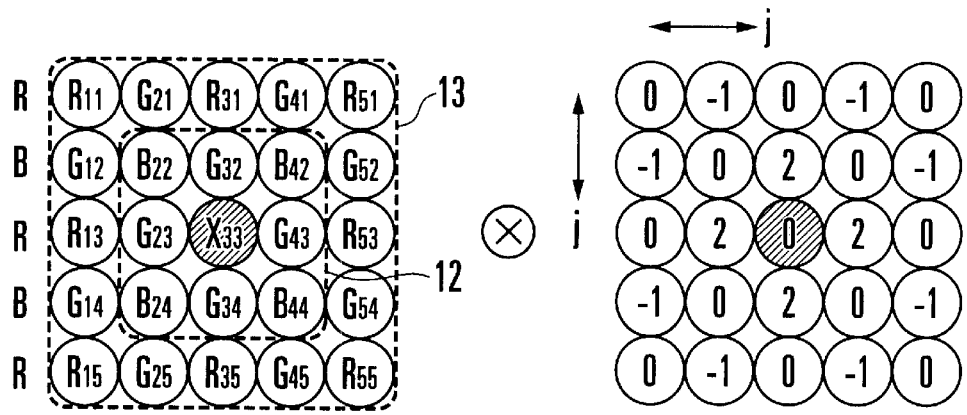
FIG.2A                FIG.2B
$$G_{33} = \frac{G_{32} + G_{23} + G_{43} + G_{34}}{4}$$
$$R_{33} = R_{33}$$
$$B_{33} = \frac{B_{22} + B_{42} + B_{24} + B_{44}}{4}$$
$$HF_{33} = \frac{2 \times (G_{32} + G_{23} + G_{43} + G_{34}) - (G_{21} + G_{41} + G_{12} + G_{52} + G_{14} + G_{54} + G_{25} + G_{45})}{gf}$$
$$G'_{33} = G_{33} + HF_{33}$$
$$R'_{33} = R_{33} + HF_{33}$$
$$B'_{33} = B_{33} + HF_{33}$$
FIG.2C

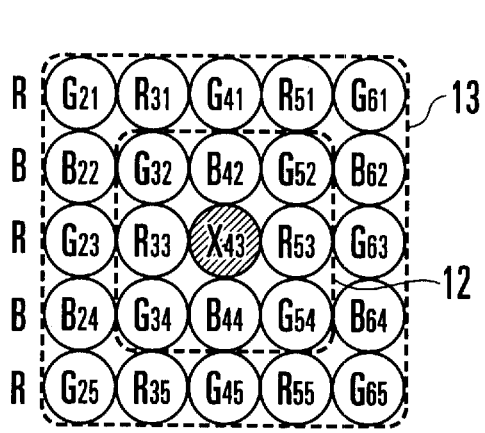
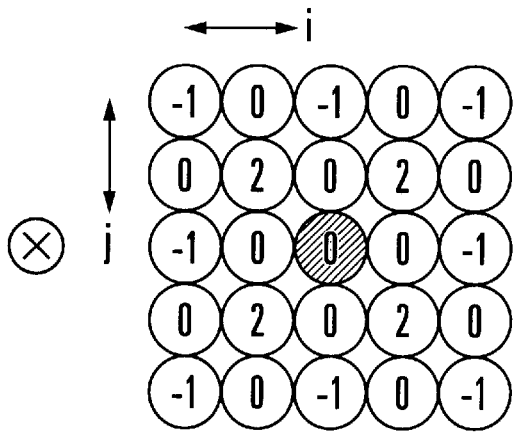
FIG.3A          FIG.3B
$$G_{43} = G_{43}$$
$$R_{43} = \frac{R_{33} + R_{53}}{2}$$
$$B_{43} = \frac{B_{42} + B_{44}}{2}$$
$$HF_{43} = \frac{2 \times (G_{32} + G_{52} + G_{34} + G_{54}) - (G_{21} + G_{41} + G_{61} + G_{23} + G_{63} + G_{25} + G_{45} + G_{65})}{gf}$$
$$G'_{43} = G_{43} + HF_{43}$$
$$R'_{43} = R_{43} + HF_{43}$$
$$B'_{43} = B_{43} + HF_{43}$$
FIG.3C

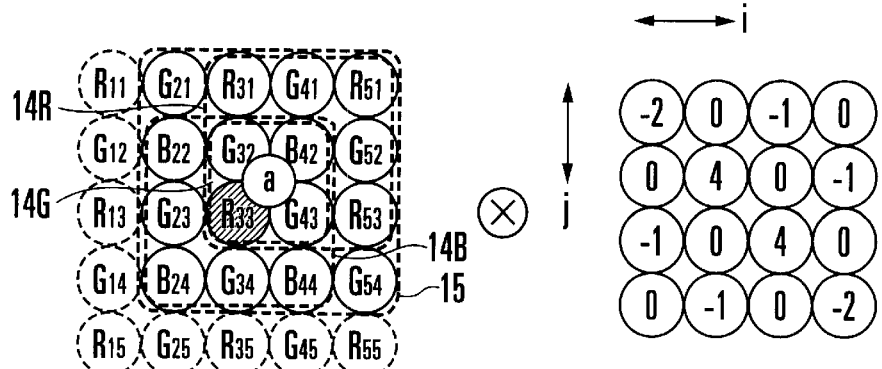
FIG.5A        FIG.5B
$$Ga = \frac{G_{32} + G_{43}}{2}$$
$$Ra = \frac{5 \times R_{33} + R_{31} + R_{51} + R_{53}}{8}$$
$$Ba = \frac{5 \times B_{42} + B_{22} + B_{24} + B_{44}}{8}$$
$$HFa = \frac{4 \times (G_{32} + G_{43}) - 2 \times (G_{21} + G_{54}) - (G_{41} + G_{52} + G_{23} + G_{34})}{gf}$$
$$G'a = Ga + HFa$$
$$R'a = Ra + HFa$$
$$B'a = Ba + HFa$$
FIG.5C
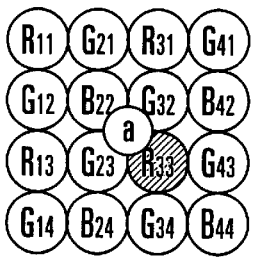 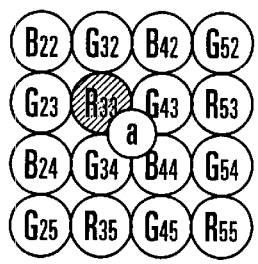 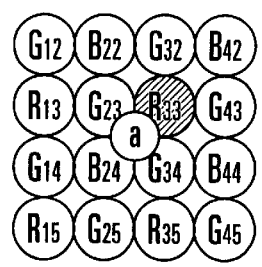
FIG.6A    FIG.6B    FIG.6C

$A = B_{22} + B_{42} + B_{24} + B_{44}$
$B = X_{33}$
$C = G_{21} + G_{41} + G_{12} + G_{52} + G_{14} + G_{54} + G_{25} + G_{45}$
$D = G_{23} + G_{43}$
$E = G_{32} + G_{34}$
$F = R_{11} + R_{31} + R_{51} + R_{13} + R_{53} + R_{15} + R_{35} + R_{55}$ $$G_{22} = \frac{G_{21} + G_{12} + G_{23} + G_{32}}{4}$$

$$R_{22} = R_{22}$$

$$B_{22} = \frac{B_{11} + B_{31} + B_{13} + B_{33}}{4}$$

$$G_{32} = G_{32}$$

$$R_{32} = \frac{R_{22} + R_{42}}{2}$$

$$B_{32} = \frac{B_{31} + B_{33}}{2}$$

IMAGE PROCESSING APPARATUS

BACKGROUND OF THE INVENTION

The present invention relates to an image processing apparatus and, more particularly, to an image processing apparatus for generating a high-quality image from a two-dimensional color image signal sensed by a single-CCD color electronic camera device.

Generally in an electronic image sensing apparatus for sensing an image using an image sensor such as a multi-color filtered CCD, an image signal having all color information (RGB or a luminance value and color difference signals) for each pixel is generated from an image having the pixel value of only one of a plurality of colors (primary colors) for each of many pixels arrayed in an almost two-dimensional checkered pattern.

In generating an image signal containing all color information for each pixel, insufficient color information at each pixel position is interpolated using the pixel values of peripheral pixels having the insufficient color information.

However, the number of pieces of information of each color by an image signal from a single-CCD color image sensing element is essentially smaller than the total number of pixels of the image sensing element. Thus, an image signal generated by interpolation is blurred.

Particularly when an image signal is generated by interpolation using only adjacent pixels of the same color (insufficient color), this phenomenon typically occurs. In many cases, color information which should not originally exist at a pixel position is generated.

To prevent this phenomenon, conventional single-CCD color image sensing apparatuses adopt various interpolation methods.

FIGS. 15A and 15B show interpolation processing by a conventional image processing apparatus.

FIGS. 15A and 15B show the pixel array of a color image sensing element using a so-called Bayer array. Pixels of red (R), green (G), and blue (B) are arrayed in a checkered pattern.

To generate image information having pixel values (luminance information) of three, R, G, and B colors for each pixel from this array data, an interpolated pixel value of each color is most simply calculated by performing the following interpolation calculation using the pixel values of peripheral pixels in the same color as color information to be calculated among pixels included in a 3×3 sub-matrix centered on a pixel to be interpolated.

For example, as shown in FIG. 15A, when an R pixel is positioned at the center of the sub-matrix, $R_{22}$ is kept unchanged, and $G_{22}$ and $B_{22}$ are interpolated by adjacent pixel values.

As shown in FIG. 15B, when a G pixel is positioned at the center of the sub-matrix, $G_{32}$ is kept unchanged, and $R_{32}$ and $B_{32}$ are interpolated by adjacent pixel values.

However, most of the conventional methods cannot attain a sufficient image quality though interpolation processing of the pixel value is simple at a high speed.

In the example shown in FIGS. 15A and 15B, as is apparent from the above-described equations, each color data exhibits the same results as those obtained when data is passed through a low-pass filter in units of several pixels. No high image quality can, therefore, be attained.

To the contrary, there is proposed an arrangement of obtaining a high-quality image by executing high-order interpolation using a wider sub-matrix to interpolate the high-frequency component of the spatial frequency, or adaptively changing the calculation method depending on complicated conditions in order to prevent generation of a false color (see International Patent Laid-Open Nos. 61-501423 and 61-501424 and U.S. Pat. No. 5,805,217).

However, this processing must execute complicated calculation, and processing which changes depending on conditions must be done. Thus, this arrangement cannot cope with high-speed, real-time processing.

For example, to perform calculation whose processing changes depending on conditions in real time, calculation for each condition must be done in advance, and when conditions are determined, proper results must be selected from the prepared ones. This increases the circuit scale and power consumption.

To perform high-order interpolation, values at two points are required in one direction except for an interpolation point. To interpolate each color signal by pixel values of the same color, the number of R or B pixels essentially smaller than the number of G pixels must be 9×9 original pixels for high-order interpolation in two directions (X and Y directions).

Hence, the number of calculation processes increases, and in addition the capacity of a buffer memory for temporarily storing pixel information for calculation increases in accordance with the number of pixels.

An image blurred by interpolation is made clearer by adjusting spatial frequency characteristics after interpolation processing to emphasize a high-frequency component. However, a high frequency which does not originally exist cannot be emphasized. A blurred image cannot be satisfactorily made clear without processing of leaving sufficient high-frequency information in interpolation.

SUMMARY OF THE INVENTION

The present invention has been made to overcome the conventional drawbacks, and has as its object to provide an image processing apparatus capable of obtaining a high-quality image without performing complicated pixel interpolation processing.

To achieve the above object, according to the present invention, there is provided an image processing apparatus for interpolating, for an image signal which is made up of many pixels arranged on a two-dimensional plane and has a pixel value corresponding to any one of a plurality of color signals for each pixel, a pixel value at an arbitrary interpolation point arranged on the two-dimensional plane by pixel values of peripheral pixels, and generating an image signal having pixel values of all the color signals for each interpolation point, comprising an interpolation unit for interpolating a pixel value of each color signal at the interpolation point using pixel values of pixels in the same color falling within a predetermined interpolation region including the interpolation point, and outputting the pixel value as an interpolated pixel value at the interpolation point for each color signal, a compensation value calculation unit for generating a pixel compensation value for compensating a pixel value of the interpolation point using pixel values of a plurality of pixels around the interpolation point that fall within a compensation region wider than and including the interpolation region, and a compensation unit for compensating the interpolated pixel value of each color signal at the interpolation point that is output from the interpolation unit by using the pixel compensation value corresponding to the interpolation point that is obtained by the compensation value calculation unit, and outputting the interpolated pixel value compensated as a new pixel value of each color signal at the interpolation point.

BRIEF DESCRIPTION OF THE DRAWINGS

FIG. 1 is a block diagram showing an image processing apparatus according to an embodiment of the present invention;

FIGS. 2A to 2C are explanatory views showing image processing operation (the interpolation point is set at an R pixel) according to the first embodiment;

FIGS. 3A to 3C are explanatory views showing image processing operation (the interpolation point is set at a G pixel on an R pixel line) according to the first embodiment;

FIGS. 5A to 5C are explanatory views showing image processing operation according to the second embodiment;

FIGS. 6A to 6C are views each showing the setting position of the interpolation point;

DESCRIPTION OF THE PREFERRED EMBODIMENTS

Figure 4A:
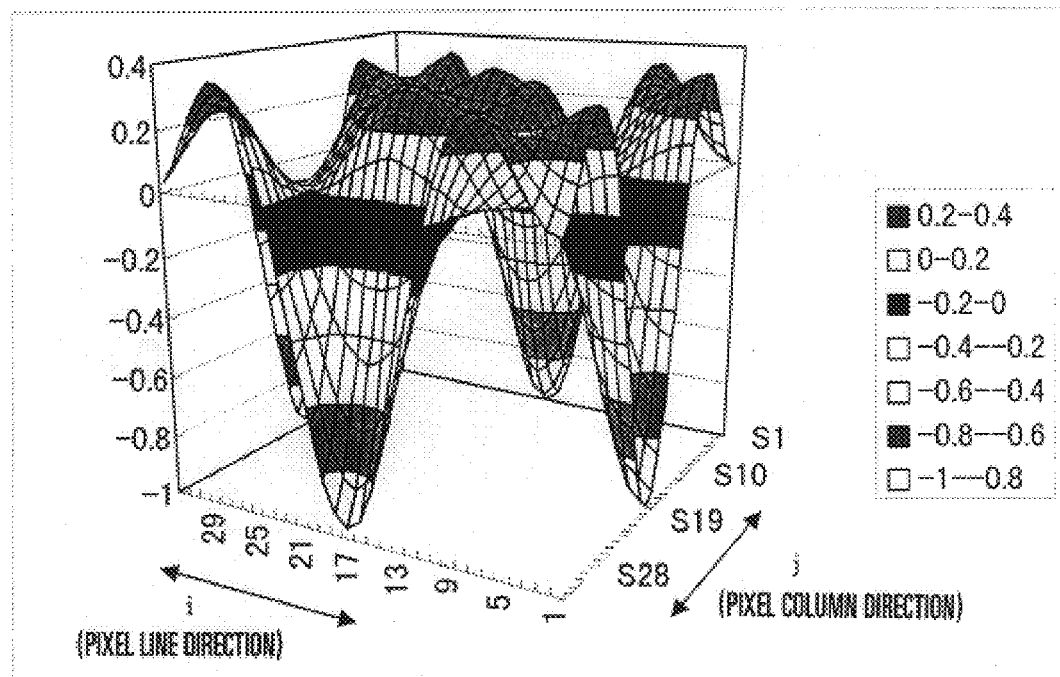
FIGS. 4A and 4B are graphs each showing the spatial frequency characteristics of a pixel compensation value obtained by a compensation value calculation unit.

The present invention will be described below with reference to the accompanying drawings.

FIG. 1 shows an image processing apparatus according to an embodiment of the present invention.

In FIG. 1, an image processing apparatus 10 comprises an interpolation unit 4 for interpolating the pixel value of each color signal at an arbitrary interpolation point by using the pixel values of peripheral pixels of the same color falling within a predetermined interpolation region including the interpolation point arranged on a two-dimensional plane constituted by an input image signal 1, and for outputting the interpolated value as an interpolated pixel value 5 at the interpolation point for each color signal.

The image processing apparatus 10 further comprises a compensation value calculation unit 6 for generating a pixel compensation value 7 for compensating the pixel value of the interpolation point using the pixel values of a plurality of pixels around the interpolation point that fall within a compensation region wider than and including the interpolation region used by the interpolation unit 4, and a compensation unit 8 for compensating the interpolated pixel value 5 of each color signal at the interpolation point that is output from the interpolation unit 4 by using the pixel compensation value 7 obtained by the compensation value calculation unit 6, and for outputting the compensated value as a new pixel value 9 of each color signal at the interpolation point.

In the following description, the image signal 1 is an image signal output from an image sensing element such as a multi-color filtered CCD, i.e., an image signal having a so-called Bayer array in which R, G and B pixels are arrayed in an almost checkered pattern. However, the image signal 1 is not limited to this.

The first embodiment of the present invention will be described with reference to FIGS. 2A to 2C and 3A to 3C.

FIGS. 2A to 2C and 3A to 3C show image processing operation according to the first embodiment of the present invention. FIGS. 2A to 2C show a case wherein the interpolation point is set at an R. pixel, and FIGS. 3A to 3C show a case wherein the interpolation point is set at a G pixel on an R pixel line.

Processing operation when the interpolation point is set at an R pixel will be explained with reference to FIGS. 2A to 2C.

FIG. 2A shows a pixel array example, FIG. 2B shows filter coefficients for calculating a compensation value, and FIG. 2C shows equations representing interpolation processing, compensation value calculation processing, and compensation processing.

The interpolation unit 4 calculates the interpolated pixel values 5 ($G_{33}$, $R_{33}$, and $B_{33}$) at an interpolation point ($X_{33}$) set as the center by using the pixel values of predetermined pixels adjacent to the interpolation point $X_{33}$ among the pixels of the input image signal 1, as shown in FIG. 2A.

Each interpolated pixel value 5 is calculated by the equation shown in FIG. 2C using the pixel values of peripheral pixels of the same color falling within an interpolation region 12 of 3×3 pixels which surrounds the interpolation point $X_{33}$, i.e., is centered on the interpolation point $X_{33}$.

At the same time, the compensation value calculation unit 6 generates the pixel compensation value 7 ($HF_{33}$) for compensating the pixel value of each color signal at the interpolation point by the equation shown in FIG. 2C using the pixel values of predetermined pixels around the interpolation point $X_{33}$ used by the interpolation unit 4, the filter coefficients shown in FIG. 2B, and a compensation scale factor (weighting factor) gf.

Calculation of the pixel compensation value 7 uses predetermined pixels falling within a range, e.g., compensation region 13 of 5×5 pixels corresponding to the filter coefficients that is wider than the interpolation region used for interpolation processing of the interpolation unit 4, and includes the interpolation region.

The interpolated pixel value 5 calculated by the interpolation unit 4 does not contain any high spatial frequency component in the pixel region centered on the interpolation point. To the contrary, the pixel compensation value 7 contains a high spatial frequency component in the pixel region.

As given by the equations of FIG. 2C, the compensation unit 8 adds (or integrates) the pixel compensation value 7 to the interpolated pixel values 5, compensates the interpolated pixel values of the respective color signals, and calculates new pixel values 9 ($G'_{33}$, $R'_{33}$, and $B'_{33}$) of the respective color signals at the interpolation point ($X_{33}$).

Processing operation when the interpolation point is set at a G pixel on an R pixel line will be explained with reference to FIGS. 3A to 3C.

FIG. 3A shows a pixel array example, FIG. 3B shows filter coefficients for calculating a compensation value, and FIG. 3C shows equations representing interpolation processing, compensation value calculation processing, and compensation processing.

In processing operation when the interpolation point is set at a G pixel on an R pixel line, the interpolation point is shifted by one pixel in the pixel line direction, compared to processing operation when the interpolation point is set at an R pixel, as shown in FIGS. 2A to 2C.

Hence, the processing operations of the interpolation unit 4, compensation value calculation unit 6, and compensation unit 8 are almost the same as those in FIGS. 2A to 2C.

However, since an interpolation point ($X_{34}$) is originally a G pixel, the equations for calculating the interpolated pixel values 5 by the interpolation unit 4 and the equation for calculating the pixel compensation value 7 by the compensation value calculation unit 6 change as shown in FIG. 3C.

In addition, the filter coefficients for calculating the pixel compensation value 7 by the compensation value calculation unit 6 change as shown in FIG. 3B.

Figure 4B:
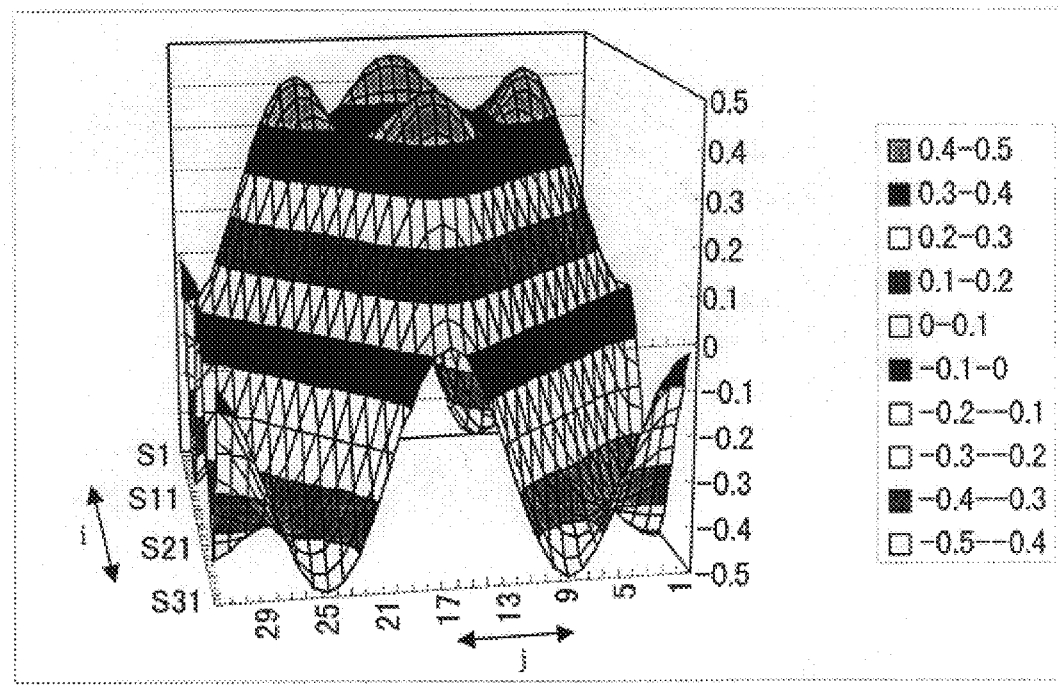

FIGS. 4A and 4B show the spatial frequency characteristics of the pixel compensation value obtained by the compensation value calculation unit. FIG. 4A shows the case of FIG. 2B, and FIG. 4B shows the case of FIG. 3B.

In this example, the compensation scale factor gf in the HF equation is 16.

In FIGS. 2A to 2C and 3A to 3C, the interpolation point is on an R pixel line. When the interpolation point is on a B pixel line, R and B pixels in FIGS. 2A to 2C and 3A to 3C are exchanged.

When the interpolation point is on a B pixel line, R and B in the equations shown in FIGS. 2C and 3C are exchanged.

According to the present invention, the interpolation unit 4 calculates each interpolated pixel value 5 at the interpolation point from the pixel values of pixels in the same color falling within the predetermined interpolation region 12 including the interpolation point. The compensation value calculation unit 6 calculates the pixel compensation value 7 at the interpolation point from the pixel values of a plurality of pixels falling within the compensation region 13 wider than and including the interpolation region used by the interpolation unit 4. The compensation unit 8 compensates the interpolated pixel value 5 using the pixel compensation value 7.

A high spatial frequency component which cannot be obtained by low-order interpolation in the interpolation unit 4 is compensated by using the pixel compensation value 7, thereby obtaining a new pixel value containing the high spatial frequency component.

As a result, a high-quality image having a high-frequency component can be attained by relatively simple processing without performing high-order interpolation for all color signals using the pixel values of pixels in a wide range or performing complicated interpolation processing under various conditions around the interpolation point, unlike the prior art.

The compensation value calculation unit 6 calculates the pixel compensation value 7 using only the pixel values of a plurality of pixels having a color signal which represents the luminance component of an image signal, e.g., using only the pixel values of G pixels for an image signal having a Bayer array, as shown in FIGS. 2A to 2C and 3A to 3C.

Thus, the compensation unit 8 can compensate only luminance components for the pixel values of pixels of each color signal without changing color balance.

In general, the pixel which represents the luminance component is the largest in number and has the highest frequency component. A new pixel value containing a higher frequency component can be obtained, compared to a pixel value interpolated by only pixels of the same color.

The second embodiment of the present invention will be described with reference to FIGS. 5A to 5C.

FIGS. 5A to 5C show image processing operation according to the second embodiment of the present invention. FIG. 5A shows a pixel array example, FIG. 5B shows filter coefficients for calculating a compensation value, and FIG. 5C shows equations representing interpolation processing, compensation value calculation processing, and compensation processing.

In the first embodiment, the interpolation point is set at a pixel. However, the interpolation point is not limited to the same position as a pixel, and may be set at a position shifted from a pixel position, i.e., between pixels.

In the second embodiment, an interpolation point a is set between pixels.

In FIG. 5A, the interpolation point a is set at a position shifted from the R pixel $R_{33}$ serving as the interpolation point $X_{33}$ in FIG. 2A to an upper right position and surrounded by four, R pixel R33, G pixel $G_{32}$, G pixel $G_{43}$, and B pixel $B_{42}$.

In this case, an interpolation unit 4 calculates, based on the equation shown in FIG. 5C, each interpolated pixel value 5 (Ga, Ra, or Ba) from peripheral pixels of the same color included in an interpolation region 14G of 2×2 pixels or an interpolation region 14R or 14B of 3×3 pixels including the interpolation point a.

At the same time, a compensation value calculation unit 6 generates a pixel compensation value 7 (HFa) for compensating the pixel value of each color signal at the interpolation point a by the equation shown in FIG. 5C using the pixel values of a plurality of pixels around the interpolation point a that fall within a range wider than and including the interpolation region used by the interpolation unit 4, the filter coefficients shown in FIG. 5B, and a compensation scale factor (weighting factor) gf.

Calculation of the pixel compensation value 7 uses predetermined pixels falling within a range centered on the interpolation point a, and wider than the region used at the interpolation unit 4 for interpolating each color value, e.g., compensation region 15 of 4×4 pixels corresponding to the filter coefficients.

The interpolated pixel value 5 calculated by the interpolation unit 4 does not contain any high spatial frequency component in the pixel region centered on the interpolation point. To the contrary, the pixel compensation value 7 contains a high spatial frequency component corresponding to the pixel region and coefficients.

As given by the equations of FIG. 5C, a compensation unit 8 adds (or integrates) the pixel compensation value 7 to the interpolated pixel values 5, compensates the interpolated pixel values 5 of the respective color signals, and calculates new pixel values 9 (G'a, R'a, and B'a) of the respective color signals at the interpolation point a.

FIGS. 6A to 6C show the setting position of the interpolation point.

In FIGS. 5A to 5C, the interpolation point a is set at the upper right of the R pixel $R_{33}$. However, the setting position of the interpolation point a may be set at the upper left, lower right, or lower left of the R pixel $R_{33}$, as shown in FIGS. 6A to 6C.

In FIG. 6A, the pixel array example in FIG. 5A is horizontally reversed (or rotated through 90°). In accordance with this, the filter coefficients in FIG. 5B are horizontally reversed (or rotated through 90°).

In FIGS. 6B and 6C, R and B pixels in FIGS. 5A to 5C and 6B are exchanged. The interpolated pixel values 5 are calculated by exchanging R and B.

In any case, similar to the equations in FIG. 5C, the interpolated pixel values 5 are calculated from pixels falling within the interpolation region of 2×2 pixels or 3×3 pixels including the interpolation point a, and the pixel compensation value 7 is calculated from predetermined pixels falling within the compensation region of 4×4 pixels wider than the interpolation region.

In FIGS. 5A to 5C, the interpolation point is positioned at the upper right of an R pixel. A case wherein the interpolation point is positioned at the upper right of a G or B pixel corresponds to any one of the cases shown in FIGS. 5A and 6A to 6C.

For example, when the interpolation point a is set at the upper right of a G pixel on an R pixel line, the positional relationship between the target pixel and the interpolation point coincides with that in FIG. 6A.

Processes for all cases can therefore be executed with the four patterns shown in FIGS. 5A and 6A to 6C.

Figure 7A:
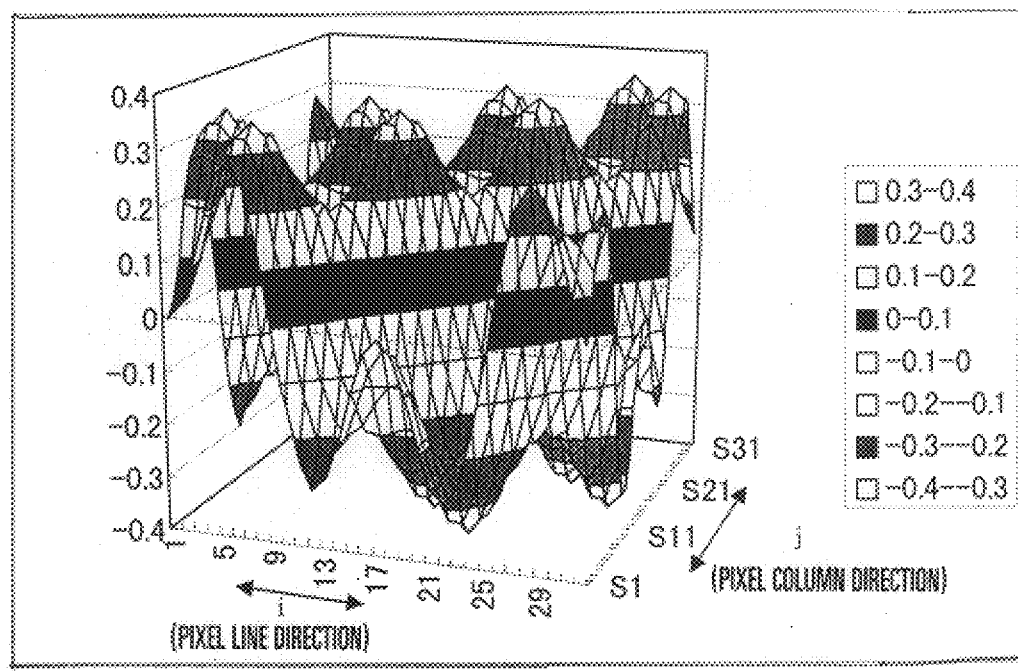
FIGS. 7A and 7B are graphs each showing the spatial frequency characteristics of the pixel compensation value obtained by the compensation value calculation unit.
Figure 7B:
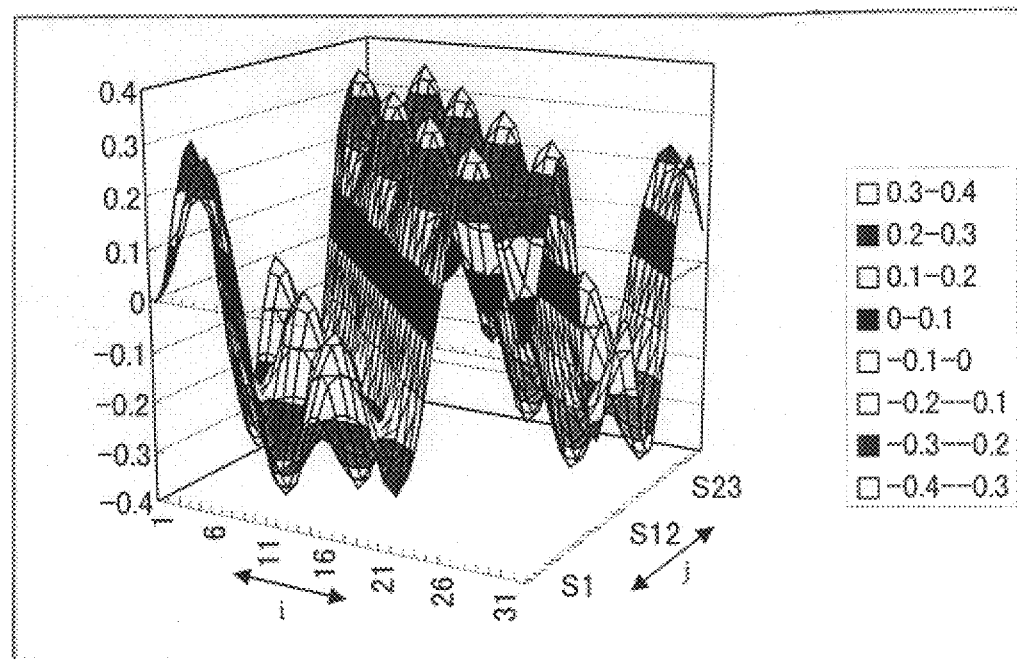

FIGS. 7A and 7B show the spatial frequency characteristics of the pixel compensation value obtained by the compensation value calculation unit. FIG. 7A shows the case of FIG. 5B, and FIG. 7B shows the case of FIG. 6B.

In this example, the compensation scale factor gf in the HF equation is 32.

In this manner, even if the interpolation point is set at a position shifted from a pixel position, a new pixel value can be calculated similarly to the first embodiment, and a high-quality image having a high spatial frequency component can be attained by relatively simple processing.

The pixel compensation value 7 is calculated using only the pixel values of a plurality of pixels having a color signal which represents the luminance component of an image signal, e.g., using only the pixel values of G pixels for an image signal having a Bayer array. For this reason, the compensation unit 8 can compensate only luminance components for the pixel values of pixels of each color signal without changing color balance.

When the number of pixels on one side of a region is even, like a region of 4×4 pixels used to calculate a compensation value, the spatial frequency characteristics of the pixel compensation value 7 change for each pixel. However, only the direction of the pixel compensation value 7 changes, and its characteristics remain unchanged.

A change in the characteristics of the pixel compensation value 7 caused by the position of the interpolation point is smaller than a case wherein the number of pixels on one side is odd. Thus, a higher-quality image can be obtained.

Figures 8A, 8B:
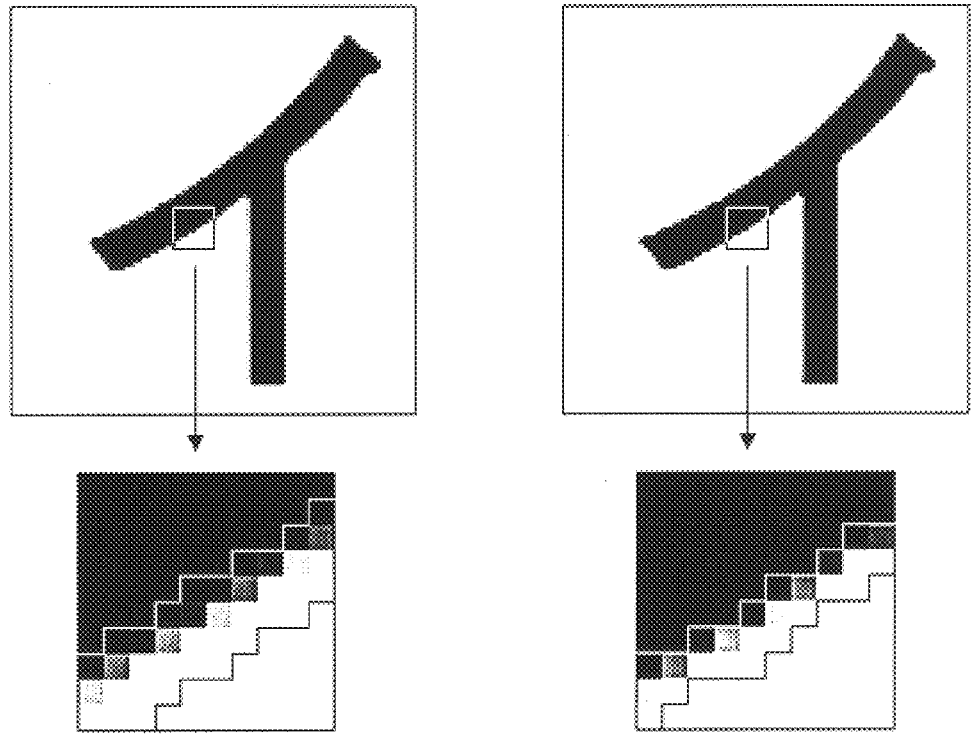
FIGS. 8A and 8B are explanatory views each showing an output example of an image obtained by the second embodiment.

FIGS. 8A and 8B show output examples of an image obtained by the second embodiment. The output examples are interpolation results (simulation results) of an image "λ" sensed by a single-CCD color image sensing element. Original image "λ" has black and white colors only.

Each rectangle is a partial enlarged portion of the image "λ" (for 10×10 pixels).

Figure 15A:
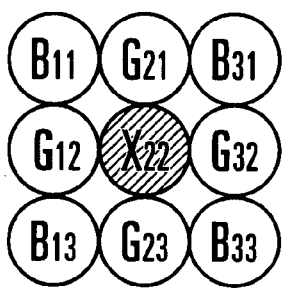
FIGS. 15A and 15B are explanatory views each showing conventional image processing operation.
Figure 15B:
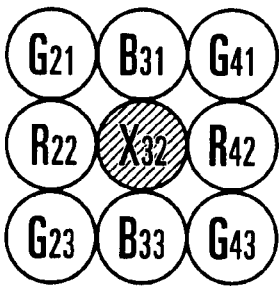

FIG. 8A shows an output example when only the same low-order interpolation as that shown in FIGS. 15A and 15B is performed.

FIG. 8B shows an output example when the present invention is applied using the coefficient filter in FIG. 2B, 3B, or 5B.

The two output examples are compared to find that, as is apparent from the enlarged portion in FIG. 8B, generation of a blur of the original image and generation of a false color (which should not originally exist at a pixel position) are suppressed at an edge portion at which the color changes from black to white, and a high-quality clearer image is obtained, compared to FIG. 8A.

At the enlarged portion in FIG. 8A, many pixels having false color are generated other than black and white pixels. In FIG. 8B, generation of such pixels is substantially halved.

The third embodiment of the present invention will be described with reference to FIG. 9.

In FIG. 1, the interpolation unit 4 and compensation value calculation unit 6 directly receive the image signal 1. In the third embodiment, as shown in FIG. 9, a region value calculation unit 2 is adopted to receive and pre-process an image signal 1, and then the image signal 1 is distributed to an interpolation unit 4A and compensation value calculation unit 6A.

Figure 9:
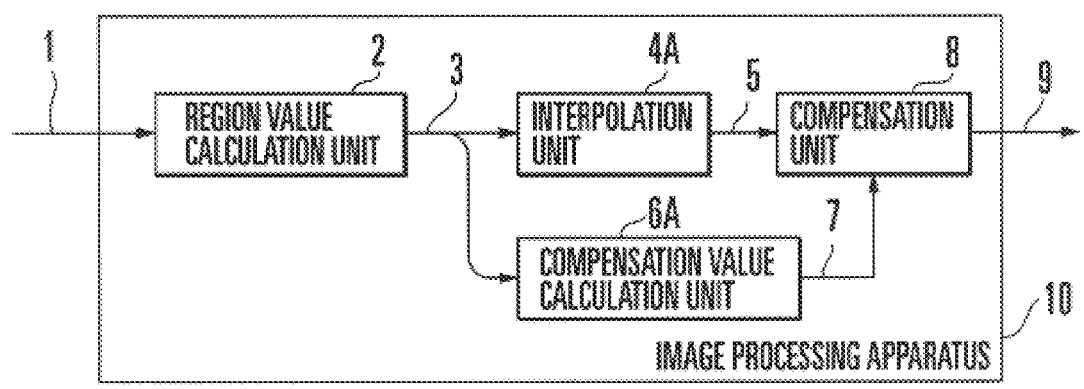
FIG. 9 is a block diagram showing an image processing apparatus according to the third embodiment.

In FIG. 9, the region value calculation unit 2 receives the image signal 1, and outputs the sums of the pixel values of pixels belonging to respective pixel regions, as region values 3 for the respective pixel regions set in advance on a sub-matrix made up of a plurality of pixels including the interpolation point as the center.

The region values 3 calculated by the region value calculation unit 2 are parallel-output in synchronism with reception of a pixel block.

Processes executed in the interpolation unit 4A and compensation value calculation unit 6A are the same as in the interpolation unit 4 and compensation value calculation unit 6 in FIG. 1 except that the interpolation unit 4A and compensation value calculation unit 6A do not directly receive the image signal 1, but selectively use the region values 3 parallel-output from the region value calculation unit 2 to sequentially calculate and output interpolated pixel values 5 and a pixel compensation value 7 at the interpolation point on the corresponding sub-matrix.

Figures 10A, 10B, 10C:
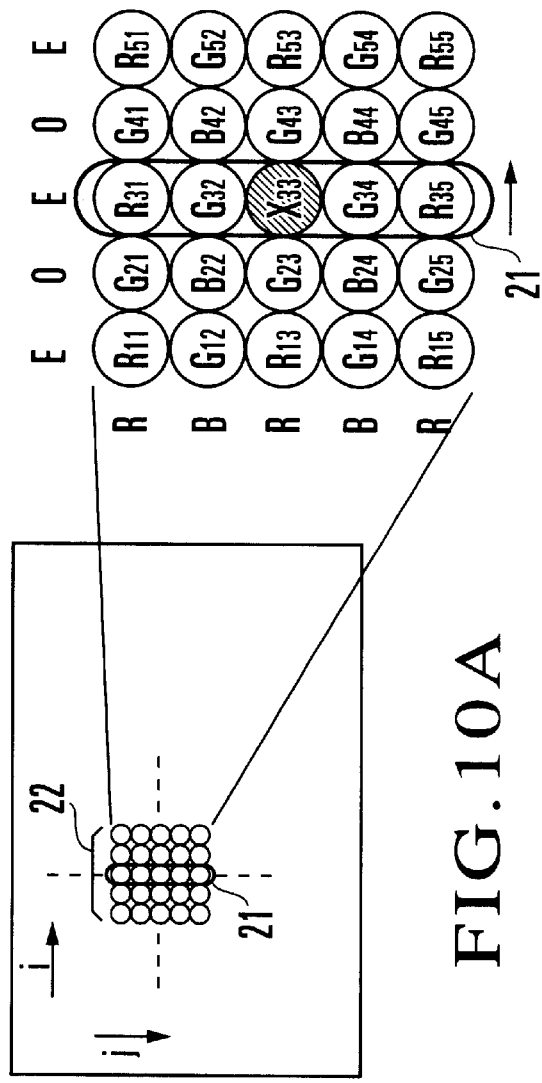
FIGS. 10A to 10C are explanatory views showing the operation of a region value calculation unit.

FIGS. 10A to 10C show the operation of the region value calculation unit. FIG. 10A shows the two-dimensional plane image of an image signal, FIG. 10B shows a sub-matrix, and FIG. 10C shows regions set on the sub-matrix.

As shown in FIG. 10A, the region value calculation unit 2 sequentially receives pixel values forming the image signal 1 by a predetermined number of pixel lines (j direction), e.g., five pixel lines as the number of pixel lines necessary for calculating the pixel compensation value 7 in parallel with each other in units of single pixel columns as pixel blocks 21.

As shown in FIG. 10B, a sub-matrix 22 is formed from the pixel blocks 21 corresponding to five pixel columns as a predetermined number of successively received pixel columns (i direction), e.g., the number of pixel columns necessary for calculating the pixel compensation value 7.

Then, the sub-matrix 22 shifts by one pixel in the i direction on the two-dimensional plane image.

For respective regions A to F set in advance on the sub-matrix 22 constituted in this way, as shown in FIG. 10C, the region value calculation unit 2 calculates the sums, i.e., region values 3 of the pixel values of pixels belonging the respective pixel regions. Then, the region value calculation unit 2 parallel-outputs the region values in synchronism with reception of the pixel block 21.

The interpolation unit 4A and compensation value calculation unit 6A selectively use the parallel-output region values, and sequentially calculate and output interpolated pixel values and a pixel compensation value at the interpolation point on the corresponding sub-matrix.

These pixel regions are set based on equations used by the interpolation unit 4A and compensation value calculation unit 6A. FIG. 10C shows the pixel regions A to F when interpolation processing and pixel compensation value calculation processing in the first embodiment are employed.

A case wherein the pixel regions A to F are set will be exemplified.

Figure 11:
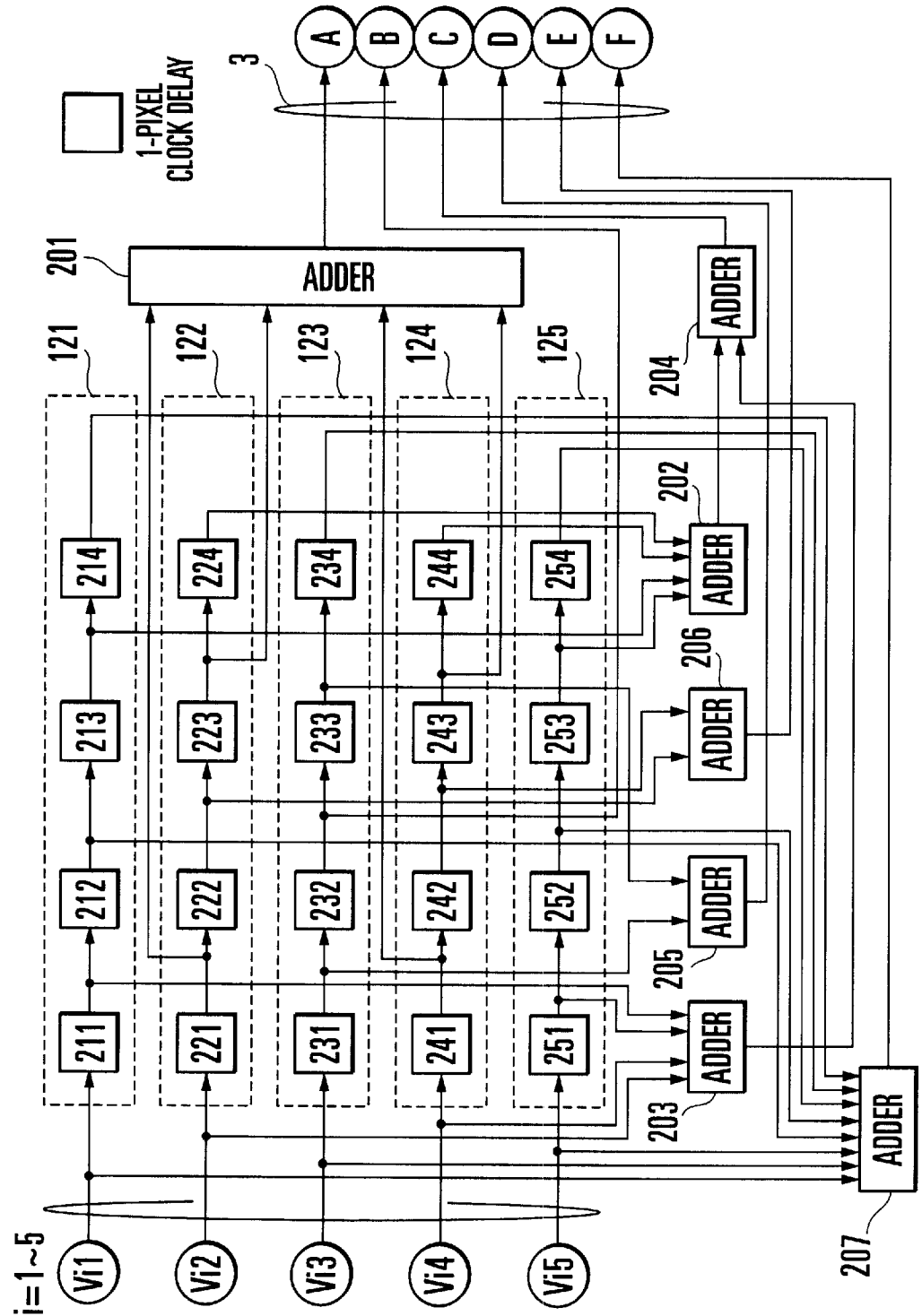
FIG. 11 is a block diagram showing an arrangement of the region value calculation unit.

FIG. 11 shows an arrangement of the region value calculation unit.

In FIG. 11, reference numerals 121 to 125 denote shift registers each made up of four series-connected 1-pixel clock delays 211 to 214, 221 to 224, 231 to 234, 241 to 244, or 251 to 254. The shift registers 121 to 125 are arranged in parallel with each other for pixel values Vi1 to Vi5 of the pixel blocks 21.

The "1-pixel clock delay" (to be referred to as a delay hereinafter) is a latch circuit for delaying and outputting an input pixel value in synchronism with a clock signal in the pixel line direction (i direction).

When five successive pixel blocks 21 are sequentially received, the delays of the shift registers 121 to 125 output pixel values at pixel positions on the sub-matrix 22.

For the pixel regions, adders 201 to 207 add all pixels belonging to the respective pixel regions and outputs from corresponding delays, thereby obtaining respective region values.

For example, the adder 201 adds outputs from the delays 221, 223, 241, and 243 corresponding to the region A in FIG. 10C to obtain a region value A.

The region value calculation unit 2 calculates the region values 3 from the received sub-matrix 22, and parallel-outputs them.

Figure 12:
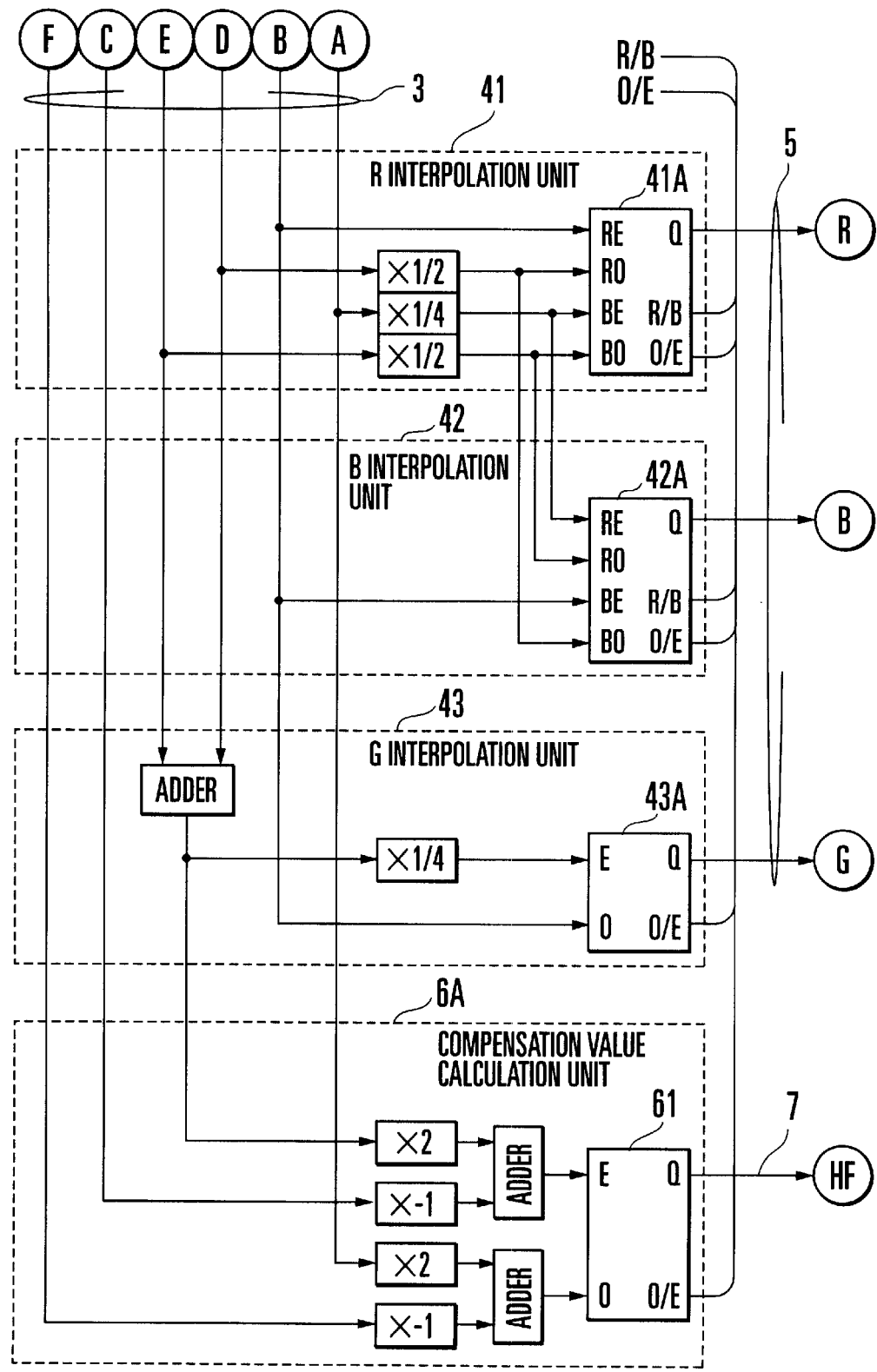
FIG. 12 is a block diagram showing an arrangement of an interpolation unit and compensation value calculation unit.

FIG. 12 shows an arrangement example of the interpolation unit and compensation value calculation unit.

The interpolation unit 4A is constituted by R, B, and G interpolation units 41, 42, and 43 for performing interpolation processes concerning R, B, and G pixels, respectively.

The interpolation units 41 to 43 parallel-calculate a plurality of interpolated pixel values corresponding to the position of the interpolation point using integrators (dividers) and adders.

Corresponding interpolated pixel values are selected by selectors 41A to 43A based on O/E and R/B signals or only the O/E signal representing the position of an actual interpolation point, and output as interpolated pixel values 5 (R, B, and G) at the interpolation point.

Note that the R/B signal represents whether the interpolation point is on an R or B pixel line, and the O/E signal represents whether the interpolation point is at a G pixel.

Similarly, the compensation value calculation unit 6A also parallel-calculates a plurality of interpolated pixel values corresponding to the position of the interpolation point using integrators (dividers) and adders.

A corresponding interpolated pixel value is selected by a selector 61 based on the O/E signal representing the position of an actual interpolation point, and output as a pixel compensation value 7 (HF) at the interpolation point.

As filter coefficients used to calculate a pixel compensation value, coefficients which are the sums of powers of 2 and the sum of which is a power of 2 are used. With this setting, the integrator (divider) used by the compensation value calculation unit 6A can be formed from a bit shift circuit, which greatly simplifies the circuit arrangement.

Figure 13:
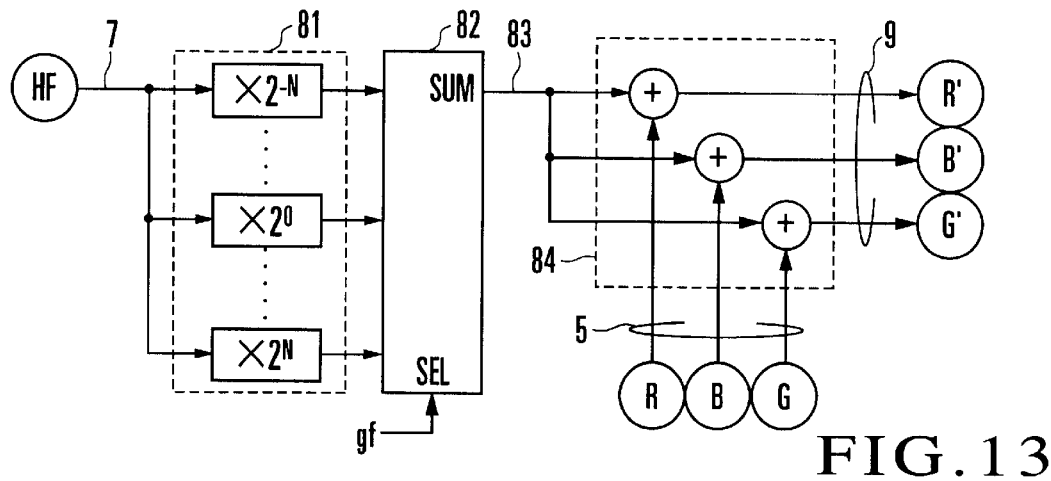
FIG. 13 is a block diagram showing an arrangement of a compensation unit.

FIG. 13 shows an arrangement of a compensation unit.

In FIG. 13, reference numeral 81 denotes an integration unit made up of a plurality of integrators for integrating (dividing) the pixel compensation value 7 by a power value of 2. The respective integrators are parallel-connected.

Reference numeral 82 denotes an adder for selectively adding at least one of outputs from the integrators of the integration unit 81 based on the compensation scale factor (weighting factor) gf.

Reference numeral 84 denotes an adder for individually adding an output 83 from the adder 82 to the interpolated pixel values 5 (R, B, and G), and outputting the sums as new pixel values 9 (R', B', and C') at the interpolation point that are compensated with the pixel compensation value 7.

By arbitrarily selectively inputting the compensation scale factor gf, the interpolated pixel value 5 can be compensated by an intensity corresponding to gf.

Since the integration unit 81 is constituted by a plurality of integrators for integrating power values of 2, an arbitrary compensation scale factor gf can be integrated to the pixel compensation value 7 with a simple circuit arrangement.

If the reference level of the pixel compensation value 7 changes in accordance with the position of the interpolation point, gf can be automatically switched in accordance with positional information of the interpolation point to adjust the reference level of the pixel compensation value 7.

As described above, the third embodiment adopts the region value calculation unit 2. The region value calculation unit 2 calculates, as the region values 3 for respective pixel regions set in advance on the sub-matrix 22, the sums of the pixel values of pixels belonging to the respective pixel regions, and parallel-outputs the region values 3 in synchronism with reception of the pixel block 21. The interpolation unit 4A and compensation value calculation unit 6A selectively use the parallel-output region values, and sequentially calculate and output interpolated pixel values and a pixel compensation value at the interpolation point on the corresponding sub-matrix 22.

The sub-matrix shifts on the two-dimensional plane image of the image signal 1 in synchronism with reception of the pixel block 21. At the same time, a new interpolated pixel value compensated with the pixel compensation value 7 is attained as the interpolated pixel value of each color signal at the interpolation point corresponding to the sub-matrix. This realizes pipeline processing synchronized with reception of the pixel block 21.

An interpolated pixel value for a higher image quality can be calculated at a higher speed, compared to a case wherein interpolation processing is done by numerical calculation using DSP or the like.

The third embodiment has been described by exemplifying the first embodiment. The third embodiment can be similarly applied to the second embodiment by constituting the circuit in correspondence with the numbers of pixel lines and pixel columns necessary for compensation value calculation processing. Also in this case, the same effects as those described above can be obtained.

When the third embodiment is applied to the second embodiment, the number of necessary pixels decreases, the number of latches for the buffer memory or delay decreases, and the necessary circuit area reduces.

Especially, the decrease in the number of lines of data to be held in the buffer memory is very effective for an image sensing apparatus such as a recent digital still camera having a large number of pixels.

The fourth embodiment of the present invention will be described.

FIG. 14 shows the arrangement of an image processing apparatus according to the fourth embodiment of the present invention.

In the above-described embodiments, the interpolated pixel value 5 obtained by the interpolation unit 4 or 4A is compensated with the pixel compensation value 7. However, the present invention is not limited to this, and the interpolated pixel value 5 may be compensated with the pixel compensation value 7 after the value 5 undergoes various processes.

Figure 14A:
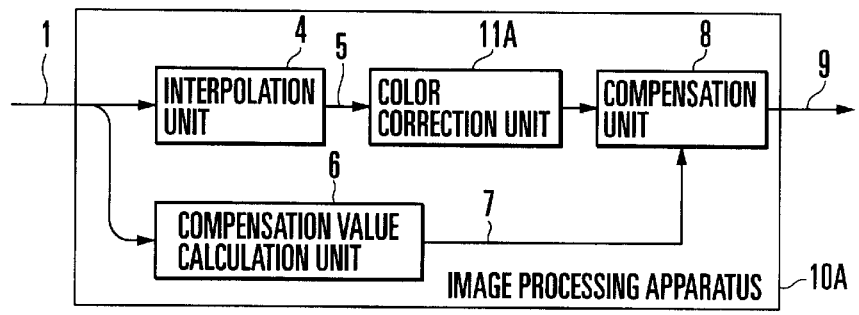
FIGS. 14A to 14C are block diagrams each showing an arrangement of an image processing apparatus according to the fourth embodiment.

For example, in FIG. 14A, a color correction unit 11A is interposed between an interpolation unit 4 and a compensation unit 8. After an interpolated pixel value 5 undergoes color balance correction, it is compensated with a pixel compensation value 7.

Figure 14B:
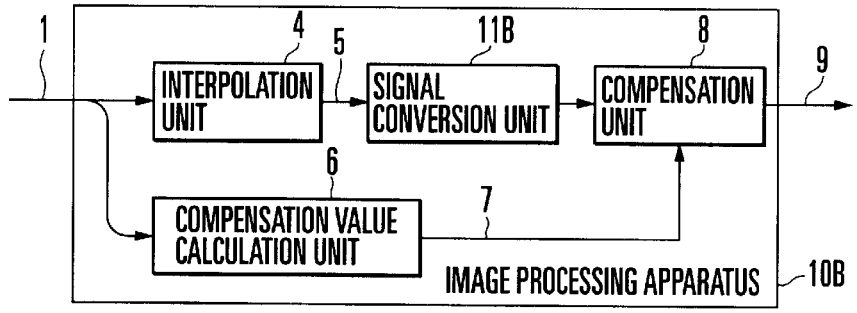

In FIG. 14B, a signal conversion unit 11B is interposed between the interpolation unit 4 and the compensation unit 8. After the interpolated pixel value 5 is converted into luminance and color difference signals, the luminance signal is compensated with the pixel compensation value 7.

As described above, the interpolated pixel value is compensated using the pixel compensation value 7 so as to uniformly compensate pixel values for respective color signals in order to compensate the luminance value.

When the interpolated pixel value 5 undergoes color balance correction, as shown in FIG. 14A, it is compensated with the pixel compensation value 7 after color balance correction. Pixel values can be more uniformly compensated for respective color signals, and the luminance value at the interpolation point can be more accurately compensated than in a case wherein color balance is corrected later.

Also when the interpolated pixel value 5 is converted into luminance and color difference signals, as shown in FIG. 14B, the luminance signal is compensated with the pixel compensation value 7 after signal conversion processing. The luminance value at the interpolation point can be more accurately compensated than in a case wherein signal conversion processing is done later.

Figure 14C:
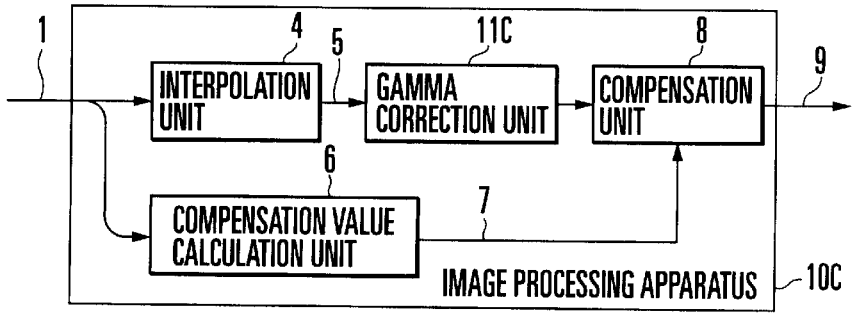

In FIG. 14C, a gamma correction unit 11C is interposed between the interpolation unit 4 and the compensation unit 8. After the interpolated pixel value 5 undergoes gamma correction, the luminance signal is compensated with the pixel compensation value 7.

General gamma correction compresses the luminance to a high-frequency region. By compensating the luminance signal with the pixel compensation value 7 after gamma correction, a lost contrast can be restored.

In this case, if compensation with the pixel compensation value 7 is controlled based on statistics representing a luminance around the interpolation point, a lost contrast can be selectively restored for a desired luminance region.

In the above-mentioned embodiments, the pixel compensation value is calculated using pixels present in a square range. However, the present invention is not limited to this, and pixels in a rectangular range may be used.

For example, in the second embodiment (see FIGS. 5A to 5C), the pixel compensation value is calculated from a range of 4×5 pixels having a length corresponding to five pixels in the i direction. In this case, the compensation value of a high spatial frequency can be calculated not only in the direction of G pixels $G_{21}$, $G_{32}$, $G_{43}$, and $G_{54}$, but also in the direction of G pixels $G_{41}$, $G_{32}$, $G_{23}$, and $G_{14}$ in FIG. 5A.

As has been described above, the present invention employs a compensation value calculation unit for generating a pixel compensation value for compensating the pixel value of the interpolation point using the pixel values of a plurality of pixels around the interpolation point that fall within a compensation region wider than and including an interpolation region used by an interpolation unit. The interpolated pixel value of each color signal at the interpolation point that is output from the interpolation unit is compensated using the pixel compensation value corresponding to the interpolation point that is obtained by the compensation value calculation unit. The compensated value is output as a new pixel value of each color signal at the interpolation point.

For the spatial frequency in the pixel region around the interpolation point, a high spatial frequency component which cannot be obtained by low-order interpolation in the interpolation unit is compensated by using the pixel compensation value. A new pixel value having spatial frequency characteristics determined by the range and coefficients of the compensation region is obtained.

Consequently, a high-quality image having a high-frequency component can be attained by relatively simple processing without performing high-order interpolation for all color signals using the pixel values of pixels in a wide range or performing complicated interpolation processing under various conditions around the interpolation point, unlike the prior art.

What is claimed is:

1. An image processing apparatus for interpolating, for an image signal which is made up of many pixels arranged on a two-dimensional plane and has a pixel value corresponding to any one of a plurality of color signals for each pixel, a pixel value at an arbitrary interpolation point arranged on the two-dimensional plane by pixel values of peripheral pixels, and generating an image signal having pixel values of all the color signals for each interpolation point, comprising:

an interpolation unit for interpolating a pixel value of each color signal at the interpolation point using pixel values of pixels in the same color falling within a predetermined interpolation region including the interpolation point, and outputting the pixel value as an interpolated pixel value at the interpolation point for each color signal;

a compensation value calculation unit for generating a pixel compensation value for compensating a pixel value of the interpolation point using pixel values of a plurality of pixels around the interpolation point that fall within a compensation region wider and including the interpolation region; and a compensation unit for compensating the interpolated pixel value of each color signal at the interpolation point that is output from said interpolation unit by using the pixel compensation value corresponding to the interpolation point that is obtained by said compensation value calculation unit, and outputting the compensated interpolated pixel value as a new pixel value of each color signal at the interpolation point.

2. An apparatus according to claim 1, wherein said interpolation unit calculates and outputs the interpolated pixel value at an interpolation point at the same position as an arbitrary pixel or between adjacent pixels.

3. An apparatus according to claim 1, wherein said compensation value calculation unit generates a pixel compensation value corresponding to the interpolation point using pixel values of a plurality of pixels having a color signal which represents a luminance component of the image signal among pixels around the interpolation point.

4. An apparatus according to claim 1, wherein said interpolation unit and said compensation value calculation unit sequentially calculate and output an interpolated pixel value and a pixel compensation value at an interpolation point on a sub-matrix using pixel values of pixels included on the sub-matrix which is sequentially received as pixel blocks from the image signal by a predetermined number of pixel lines in parallel with each other in units of single pixel columns, and made up of a predetermined number of successively received pixel blocks.

5. An apparatus according to claim 1, wherein said apparatus further comprises a region value calculation unit for sequentially receiving pixel values forming the image signal as pixel blocks by a predetermined number of pixel lines in parallel with each other in units of single pixel columns, constituting a sub-matrix by the predetermined number of successively received pixel blocks, calculating sums of pixel values of pixels belonging to respective regions set in advance on the sub-matrix as region values of the respective regions, and parallel-outputting the region values in synchronism with reception of the pixel block, and an interpolation unit and a compensation value calculation unit selectively use the region values parallel-output from said region value calculation unit, and sequentially calculate and output an interpolated pixel value and a pixel compensation value at an interpolation point on a corresponding sub-matrix.

6. The apparatus according to claim 1, wherein said interpolation unit calculates an interpolated pixel value at an interpolation point from a sum of products of pixel values of pixels used in interpolation calculation and coefficients corresponding to the pixels, and uses, as the coefficients, coefficients which are sums of powers of 2 and the sum of which is a power of 2.

7. An apparatus according to claim 1, wherein said compensation value calculation unit calculates a compensation value from a sum of products of pixel values of pixels used in compensation value calculation and coefficients corresponding to the pixels, and uses, as the coefficients, coefficients which are sums of powers of 2 and the sum of which is a power of 2.

8. An apparatus according to claim 1, wherein said apparatus further comprises a color correction unit for executing color correction processing for an interpolated image signal made of the interpolated pixel value obtained by said interpolation unit, and said compensation unit uses the pixel compensation value obtained by said compensation value calculation unit to compensate and output each pixel value after color correction by said color correction unit instead of the interpolated pixel value from said interpolation unit.

9. An apparatus according to claim 1, wherein said apparatus further comprises a signal conversion unit for converting an interpolated image signal made of the interpolated pixel value obtained by said interpolation unit into luminance and color difference signals, and said compensation unit uses the pixel compensation value obtained by said compensation value calculation unit to compensate and output the luminance signal obtained by said signal conversion unit instead of the interpolated pixel value from said interpolation unit.

10. An apparatus according to claim 1, wherein said apparatus further comprises a gamma correction unit for executing gamma correction processing for an interpolated image signal made of the interpolated pixel value obtained by said interpolation unit, and said compensation unit uses the pixel compensation value obtained by said compensation value calculation unit to compensate and output each pixel value after gamma correction by said gamma correction unit instead of the interpolated pixel value from said interpolation unit.

* * * * *